United States Patent Office 2,985,674
Patented May 23, 1961

2,985,674

PREPARATION OF CRYSTALLIZABLE STEARIC ACID

Thomas H. McGuine, Glenside, and Norman V. Feldpush, Media, Pa., assignors to Wilson & Co., Inc., a corporation of Delaware No Drawing. Filed Mar. 6, 1959, Ser. No. 797,558

18 Claims. (Cl. 260—419)

The present invention relates to methods for the preparation by distillation procedures of refined or crystallizable stearic acid having the qualities and characteristics of the better grades of commercial stearic acid, such as the double and triple pressed grades.

In accordance with the present invention, while distillation procedures are used, the use of expensive fatty acid fractionating equipment is avoided and the procedures which are employed may be carried out in simple batch or stripping stills, operated under vacuum. The desired product, with its proportions of palmitic and stearic acids in the proper range, is secured as an overhead distillate product without requiring the separate production and subsequent blending of different fractions each consisting wholly or largely of one of these acids. The present invention also permits the use, as a source of mixed fatty acids, of lower grade fats, oils and tallows in which the palmitic and stearic acids are not present in proportions processable by normal procedures to stearic acid of commerce.

In order to produce a satisfactory final product, the proportions of palmitic and stearic acids in it should approach those of an optimum eutectic mixture which ratio is 55 parts palmitic acid and 45 parts stearic acid. Eutectic crystal material may be produced from mixtures whose palmitic acid to stearic acid content vary from about 50 parts palmitic acid to 50 parts stearic acid to mixtures having about 60 parts palmitic acid to 40 parts stearic acid. A crystal product varying slightly from the structure developed by crystals produced from mixtures in the broad range may be crystallized from mixtures whose ratios are slightly below or slightly above the above set forth limits but such a product is less desirable. The above ratios refer to palmitic and stearic acid independent of the other fatty acids normally found associated therewith.

In the final product, minor proportions of fatty acids lower than palmitic acid, such as myristic and lauric acids, say up to 9% may be tolerated, although in general they should not exceed about 5%. Preferably in the final product the proportion of such fatty acids lower than palmitic is not above 3%. Minor proportions of unsaturated fatty acids may be tolerated in the final product while securing a product of the desired crystal structure, say up to 12% on a total unsaturated fatty acid basis but it is preferred that the unsaturated fatty acids be reduced to give the desired specification of the final product, for example, an iodine number of 0 to 6. In general, the lower the iodine number, the more desirable the product.

It has been discovered that a distillate product which can be crystallized to produce needlelike eutectic crystals and having a composition making the product a stearic acid of commerce having color stability and heat stability superior to the current eutectic stearic acid of commerce, can be produced by subjecting a mixture consisting substantially of saturated fatty acids having 16 and 18 carbon atoms, i.e., palmitic and stearic acids in which the stearic acid does not exceed a maximum of 75 parts by weight per 100 parts of palmitic acid-stearic acid in the mixture, to distillation under substantially non-fractionating conditions and under high vacuum at a temperature above the boiling point of palmitic acid at the pressure conditions prevailing in the still. Distilling compositions which are not eutectic compositions or are eutectic mixtures containing less than 58 parts palmitic per 100 parts of palmitic-stearic acid in the mixture but fail to meet specifications for reasons such as color, titer, acid value, unsaponifiables, and other qualification reason, to produce distillates of eutectic proportions is possible because under high vacuum, the boiling points of palmitic and stearic acid approach sufficiently close so that upon boiling the mixture at temperatures intermediate the boiling temperature of palmitic acid and the boiling temperature of stearic acid, both saturated fatty acids are sufficiently volatile to appear in a substantially non-fractionated distillate in relative proportions by weight between 50–50 palmitic-stearic acid and 60–40 palmitic-stearic acid.

Mixed fatty acids derived from tallow or other suitable fat or oil after removal of the red oil by the usual methods, may be used as the starting material. Fatty acids having 16 and 18 carbon atoms may be present in the starting materials in such proportions that upon hydrogenation, the mixture, disregarding other requirements, has a proper ratio of palmitic acid to stearic acid for distillation to a eutectic mixture. On the other hand, the ratio of fatty acids having 16 and 18 carbon atoms may be such that adjustment thereof may be necessary. This adjustment of ratio of saturated fatty acid having 16 carbon atoms to fatty acid having 18 carbon atoms may take place prior to hydrogenating the mixture, taking cognizance of the amount of oleic acid which will be converted to stearic acid by hydrogenation, or the adjustment may be made at any stage up to the substantially non-fractionating distillation by addition of predominantly saturated fatty acid rich in either $C_{16}$ fatty acid or $C_{18}$ fatty acid in order to produce a mixture of proper ratio from which to distill a eutectic mixture of palmitic and stearic acids.

After more or less complete removal of the red oil or unsaturated fatty acids from, for example, the tallow fatty acids, as by chilling and pressing or by solvent-aided processes, the remaining tallow fatty acids are hydrogenated by customary procedures to convert unsaturated fatty acids to saturated fatty acids. Thus, the residual unsaturated fatty acids from tallow source may be hydrogenated to produce a fatty acid mixture having an iodine value of 10 or less, say about 0 to 6. For higher grade products, the iodine number may be further reduced, say to 0 to 4, preferably not greater than 1. Conventional hydrogenation conditions may be employed; for example, a temperature of 200 to 260° F. at a pressure of 300 pounds per square inch, using 0.2% nickel catalyst.

Hydrogenated fatty acids have odors which detract from their acceptability as a commercial product. To remove these odors hydrogenated fatty acids are subjected to steam stripping or some other customary deodorization process to remove odor usually associated with a hydrogenated stearic acid. For example, the hydrogenated fatty acids may be heated in a tank or kettle or other deodorizing equipment under a vacuum of, for example, about 10 to 12 inches while passing steam through the liquid at a moderate pressure. Complete removal of these lower fatty acids, color and odor bodies is not always feasible without excessively prolonged treatment, but the proportion of them in the total fatty acids under treatment should be reduced to fall within the hereinatfer described limits prior to crystallization of the eutectic mixture.

Light ends, color and odor bodies may be removed prior to distillation or they can be removed simultaneously with the distillation or subsequent thereto or by a combination of the various steps.

Removal of the light ends, color and odor bodies subsequent to the distillation is an operation, substantially the same as that for removal prior to distillation. Removal during the distillation of the eutectic mixture requires a more elaborate condensing system for handling the overhead vapors from the vacuum still. This condensing system normally takes the form of a so called "hot" or first stage condenser controlled in temperature to effect a partial condensation of the vapors, i.e., condense the higher boiling fractions, while the lower boiling fractions pass through to the second condenser. This two stage condensation system is not as efficient as a good deodorization stripping still but can produce commercially acceptable eutectic crystal products. If the fatty acids having less than 16 carbon atoms are not sufficiently reduced by initial treatment, the deodorization conditions may be continued over a longer period of time or the fatty acid stock may be subjected to steam stripping at higher vacuum or with greater proportions of steam in a batch or continuous stripping operation to remove a greater proportion of such lower fatty acids either prior to or subsequent to distillation.

If the light ends, color and odor bodies are removed prior to distilling a eutectic mixture, the proportion of the fatty acids having less than 16 carbon atoms remaining in the distillation feed stock should not exceed about 5%. As has been pointed out above, the proportions of $C_{14}$ and lower fatty acids in the final product should not exceed about 9% and is preferably much lower, down to as near complete elimination as is feasible. In the distillation step, next to be described, the desired product is secured as an overhead or distillate product and hence in it the proportion of the fatty acids below $C_{16}$ is increased. Thus a stock which, after the deodorization step, contained 5.2% myristic acid and 0.9% lauric acid gave a mixed palmitic-stearic acid product containing 8.6% myristic acid and 2.2% lauric acid. The resulting product did not have a satisfactory crystal structure for a commercial stearic acid product. For better grades of refined stearic acid as a final product it is preferred to strip the fatty acid stock to below 5% $C_{14}$ and lower fatty acids, and an even greater reduction, say to 3% or lower, is highly desirable.

The fatty acid stock is subjected to distillation, preferably to a substantially non-fractionating or simple distillation under conditions to avoid decomposition and to secure as an overhead product the desired material having the characteristics of a refined eutectic stearic acid of commerce. It must consist principally of palmitic and stearic acid in the proportions necessary to give the product the accepted crystal characteristics which are associated with a eutectic composition and must, of course, meet the commercial requirements as to color, odor, iodine number, titer, and the like. At this stage, the mixture utilized as feed to the distillation must have a ratio of palmitic acid to stearic acid which does not fall below 25 parts palmitic acid to 75 parts stearic acid and which does not exceed 58 parts palmitic acid to 42 parts stearic acid by weight. According to the present invention this is accomplished without elaborate fractionation of the fatty acids and remixing and without hot pressing or elaborate solvent treatment.

In carrying out this distillation, the fatty acid mixture is distilled at high vacuum, preferably at pressures up to about 50 mm. absolute, although higher pressures, i.e., of the order of 100 mm. to 200 mm. may be used for distilling a eutectic mixture from special feed stocks, and at temperatures varying with the pressure and the degree of fractionation being indulged. To illustrate the distillation temperature range, it is known that the boiling points of stearic acid in the absence of inert gas such as steam at 3 mm., 10 mm., and 50 mm. pressure absolute are about 206° C., 230° C. and 266° C., respectively, and the boiling points of palmitic acid are 182° C., 212° C. and 250° C. at the comparable pressure levels.

Mixtures of stearic acid and palmitic acid and some lower fatty acids, distill at temperatures intermediate the boiling temperature of palmitic acid and stearic acid at the pressure conditions maintained in the still. For example, mixtures containing 75% stearic acid and 25% palmitic acid, on the basis of these two components in the mixture, may distill to a eutectic mixture of 40% stearic acid and 60% palmitic at temperatures as low as about 185° C. at a pressure of 2 mm. absolute. If the stearic acid content of the produced eutectic mixture is to be higher, the distillation temperature will be higher. In general, it may be stated that the conditions for distillation are temperatures varying from slightly above the boiling temperature of palmitic acid to the boiling temperature of stearic acid under the pressure conditions prevailing in the still.

Under the substantially non-fractionating distillation conditions involved, the ratio of palmitic to stearic acid in the overhead product is increased over that in the stock subjected to distillation. The conditions of distillation, such as the specified vacuum and temperature, for example, are controlled to secure a product corresponding to the grade of commercial stearic acid desired. Use of vacuum has a two fold purpose. In the first place, it permits distillation at temperatures sufficiently low to avoid any appreciable decomposition. Secondly, under relatively high vacuum, palmitic acid and stearic acid boil at sufficiently close temperatures, with palmitic acid boiling at about 16° C. to 24° C. below stearic acid, such that both acids are vaporized to a large degree and only require a minimum of fractionation capacity to enrich the vapors in palmitic acid and thus produce a desired eutectic composition. To give an illustration assuming a vacuum of 4 mm. pressure in the distillation equipment, an identical product can be made from two widely divergent composition feeds by distillation producing vapor temperatures of about 190° C. in the still. A product consisting of:

5.0% myristic acid
1.0% oleic acid
37.6% stearic acid
56.4% palmitic acid can be produced from either feed A or feed B.

A 0.5% myristic acid
1.0% oleic acid
71.5% stearic acid
27.0% palmitic acid

B 4.5% myristic acid
1.0% oleic acid
41.2% stearic acid
53.3% palmitic acid

Percentage recovery of the feed material as final product of the above composition is markedly lower in the case of feed A than in the case of feed B. When operating a still with constant heat input, the greater heat requirements for distillation of feed B may be met by utilizing a feed at a temperature of about 204° C. while feed A would be maintained at a temperature of about 193° C. The most desirable ratio of palmitic to stearic acid in the product is that providing the eutectic crystal mixture, which is about 55 parts palmitic acid to 45 parts stearic acid. Products having crystal characteristics corresponding to varying commercial grades of stearic acid may have ratios by proportion in the range between about 50 parts palmitic to 50 parts stearic acid and about 60 parts palmitic acid to 40 parts stearic acid.

When making reference to the boiling temperature utilized in conjunction with the sub-atmospheric pressure conditions, we are speaking of the conditions maintained in the distillation equipment. This temperature could be approximately the boiling point of for example, stearic acid at a particular absolute pressure, if the distillation feed were a relatively pure two component system containing palmitic acid in approximately the maximum allowable ratio to stearic acid. On the other hand, the boiling temperature for stearic acid when the same absolute pressure is maintained in the distillation equipment can be appreciably lower than the boiling point of stearic acid when a partial pressure is exerted due to the presence of steam or other inert gas.

The process thus makes it possible to employ stocks having lower ratios of palmitic to stearic acid than would be satisfactory for use in the ordinary pressing processes, for example. Thus, a stock suitable for use in the final distillation step may have as low as 25 parts palmitic acid per 75 parts stearic acid. It will be understood that in the distillation of such stocks, the lower the ratio of palmitic to stearic acid, the greater the proportion of still bottoms high in stearic acid that must be left by the still operator.

Operation in accordance with the present invention is illustrated by the following examples:

*Example I*

The mixed tallow fatty acids used had an analyses as follows:

| Acid: | Average percent |
|---|---|
| Lauric | 0.1 |
| Myristic | 3.0 |
| Palmitic | 29.0 |
| Stearic | 20.0 |
| Arachidic | 0.8 |
| Myristoleic | 0.5 |
| Palmitoleic | 2.0 |
| Oleic | 42.0 |
| Linoleic | 2.0 |
| Linolenic | 0.5 |
| Arachidonic | 0.1 |

These mixed fatty acids were subjected to the usual cold pressing process for the removal of oleic acid, roughly about 40% of red oil being removed. Selective solvent action at reduced temperatures, as is well known in the art, may also be employed for removal of unsaturated acids, in which case a larger proportion of the unsaturated acids, say up to 60%, are removed. The remaining fatty acids (bag stock) were then hydrogenated under standard conditions to an iodine value of below 6.0. Suitable hydrogenating conditions are 250° F. at 200 pounds per square inch pressure, using 0.2% of nickel catalyst.

The hydrogenated bag stock was then subjected to deodorization in a kettle or heated tank. The resulting deodorized stock still contained a small proportion of unsaturated fatty acids, as indicated by its iodine number. Some of the unsaturated fatty acids, as well as a large proportion of the myristic, lauric and lower fatty acids were removed.

The deodorized stock was then subjected to the non-fractionating distillation step in a continuous stripping still. This distillation was effected at 2–3 mm. absolute pressure and utilizing a feed at a temperature of 204° C. while maintaining a vapor temperature within the still of about 190° C. and the distillation was checked periodically by testing the overhead product for free fatty acid and by crystal inspection to determine if a distillate product was being maintained of a quality meeting the standards of commercial grades of stearic acid. A fall in free fatty acid, along with a loss in eutectic crystal, indicated need for a downward correction of temperature. A rise in free fatty acid, together with a eutectic crystal loss indicated need for an upward correction in temperature. Thus, the crystal product obtained from the tallow fatty acid feed stock was a high grade commercial stearic acid and had the following specifications:

| | |
|---|---|
| Crystal | Eutectic. |
| Color | 0.8 Y/0.2 R Lovibond, 5¼" cells. |
| Iodine No. | 4.0. |
| Titer | 132° F. |
| Free fatty acids (as stearic acid) | 104.0%. |
| Peroxide value | 0.0. |
| Odor | Bland, slightly waxy. |

*Example II*

Mixed tallow fatty acids from the same source and having the same analyses as shown in Example I was subjected to the usual cold pressing process for the removal of oleic acid, roughly about 40% of red oil being removed. The remaining fatty acids were hydrogenated under standard conditions to an iodine value of approximately 5 by the utilization of suitable hydrogenating conditions of 250° F. at 200 pounds per square inch pressure using 0.2% of nickel catalyst.

The hydrogenated fatty acids were then subjected to a non-fractionating distillation step in a continuous stripping still provided with two stage condensation for the vapors removed during distillation. This distillation was effected at 2–3 mm. absolute pressure and utilizing a feed having a temperature of 204° C. while maintaining a vapor temperature within the still of approximately 190° C. The first condenser was operated at temperatures between about 163° C. and 170° C. generally at approximately 167° C. to condense out a eutectic mixture of stearic acid and palmitic acid. Lower boiling fatty acids of a lesser number of carbon atoms than palmitic and stearic acids together with odor producing substances passed through this first condenser to a second condenser operated at approximately 90° C. The distillation was checked periodically by testing the overhead product for free fatty acid and by crystal inspection to determine if a distillate product was being maintained of a quality meeting the standards of commercial grades of stearic acid. A fall in free fatty acid, along with a loss in eutectic crystal, indicated need for a downward correction of temperature. A rise in free fatty acid, together with a eutectic crystal loss indicated need for an upward correction in temperature. Crystal product obtained from the tallow fatty acid feed stock was a high grade commercial stearic acid having the following specifications:

| | |
|---|---|
| Crystal | Eutectic. |
| Color | 1.1/0.3. |
| Iodine number | 3.8. |
| Titer | 131.7° F. |
| Free fatty acid | 104.3%. |
| P.V. | 0.0. |
| Odor | Bland. |

By operating in accordance with the present invention, products corresponding to the various commercial grades of stearic acid may be secured, including, for example, the double pressed and triple pressed grades.

It the feed to the above illustrated distillation were substantially odorless, the overhead product of distillation would still have a typical faint odor usually described as a distillation odor. While the eutectic stearic acid produced is saleable without further processing, the liquid eutectic distillation composition may be subjected to conventional finishing operations such as bleaching, touch-up deodorization, etc. The cumbersome and expensive equipment necessary for the refining of stearic acid by the conventional hot pressing methods, as well as the delays and discomforts incident to such processes are avoided. The same is true as to those purification methods which require controlled refrigeration in the presence of solvents, and the fire dangers due to such solvent processes are likewise avoided.

As compared with the distillation processes in which the fatty acids are separated and remixed in desired proportions, the present process is much simpler and requires no complicated and expensive fractionating columns for operation at high vacuum.

The fatty acid product crystallized from the distillate is a material of superior characteristics. The large needlelike crystals have a color stability markedlly superior to products produced by processes heretofore in use. This product is clearly distinguishable from a distilled hydrogenated tallow fatty acid in that it has the needlelike eutectic crystal, has better color, better color stability and does not have hydrogenated odor.

In operation, the distillation may be controlled by the skilled operator by observation of samples of the total distillate if a batch operation is employed, or by samples of the running distillate if a continuous stripping operation is used. Color, odor, physical and chemical tests or crystal structure are check characteristics for the different grades of stearic acid and are used to control the distillation operation.

This application is a continuation in part application of our application Serial No. 640,602, entitled Preparation of Crystallizable Stearic Acid and filed February 18, 1957, now abandoned.

Although various specific details of operation in accordance with the present invention are set forth in the foregoing specification, it is not intended that these shall be regarded as limitations upon the scope of the invention except insofar as included in the accompanying claims.

We claim:

1. In the production of eutectic stearic acid of commerce containing less than 9% of fatty acids having less than 16 carbon atoms from mixed fatty acids containing fatty acids having less than 16 carbon atoms, palmitic and stearic acids, said mixture of fatty acids having an iodine number less than 12 and a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the fatty acid mixture, the steps comprising irrespective of order, distilling said fatty acid mixture under sub-atmospheric pressure and at temperatures intermediate the boiling temperature of palmitic acid and the boiling temperature of stearic acid under the pressure conditions prevailing in the still, and fractionating out odor producing substances and fatty acids having less than 16 carbon atoms present in excess of 9% by weight on the basis of palmitic acid-stearic acid eutectic mixture distillable from said mixed fatty acids and crystallizing a eutectic product identifiable as stearic acid of commerce from the distillate product.

2. In the production of eutectic stearic acid of commerce containing less than 9% of fatty acids having less than 16 carbon atoms from mixed fatty acids containing fatty acids having less than 16 carbon atoms, palmitic and stearic acids, said mixture of fatty acids having an iodine number less than 12 and a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the fatty acid mixture, the steps comprising subjecting the fatty acid mixture to a stripping distillation at reduced pressure to remove odor producing substances and fatty acids having less than 16 carbon atoms present in excess of 9% by weight on the basis of the palmitic acid-stearic acid eutectic mixture distillable from said mixed fatty acids, distilling the stripped fatty acid mixture under sub-atmospheric pressure and at temperatures intermediate the boiling temperature of palmitic acid and the boiling temperature of stearic acid under the pressure conditions prevailing in the still, and crystallizing a eutectic product identifiable as stearic acid of commerce from the distillate product.

3. In the production of eutectic stearic acid of commerce containing less than 9% of fatty acids having less than 16 carbon atoms from mixed fatty acids containing fatty acids having less than 16 carbon atoms, palmitic and stearic acids, said mixture of fatty acids having an iodine number less than 12 and a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the fatty acid mixture, the steps comprising distilling the fatty acid mixture under sub-atmospheric pressures and at a temperature intermediate the boiling temperature of palmitic acid and the boiling temperature of stearic acid under the pressure conditions prevailing in the still, subjecting the distillate product to a stripping distillation at reduced pressure to remove odor producing substances and fatty acids having less than 16 carbon atoms present in excess of 9% by weight on the basis of the palmitic acid-stearic acid eutectic mixture distillable from said mixed fatty acids, and crystallizing a eutectic product identifiable as stearic acid of commerce from the stripped distillate product.

4. In the production of eutectic stearic acid of commerce containing not more than 9% of fatty acids having less than 16 carbon atoms from mixed fatty acids containing fatty acids having less than 16 carbon atoms, palmitic and stearic acids, said mixture of fatty acids having an iodine number less than 12 and a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the fatty acid mixture, the steps comprising distilling said fatty acid mixture under sub-atmospheric pressure and at a temperature intermediate the boiling temperature of palmitic acid and the boiling temperature of stearic acid under the pressure conditions prevailing in the still, to produce a vapor product containing fatty acids of less than 16 carbon atoms, odor producing substances, palmitic acid and stearic acid, condensing a predominantly eutectic mixture of palmitic acid and stearic acid containing less than 9% by weight of fatty acids having less than 16 carbon atoms on the basis of palmitic acid-stearic acid eutectic mixture distillable from said fatty acid mixture from said vapors and crystallizing a eutectic product identifiable as stearic acid of commerce from the condensed mixture of palmitic acid and stearic acid.

5. In the production of eutectic stearic acid containing less than 9% of fatty acids having less than 16 carbon atoms from mixed fatty acids containing fatty acids having less than 16 carbon atoms, palmitic acid and stearic acid the steps comprising hydrogenating said fatty acid mixture to convert unsaturated materials therein to saturated compounds, subjecting the hydrogenated mixtures of fatty acids to stripping distillation at reduced pressure to remove odor producing substances and fatty acids having less than 16 carbon atoms present in excess of 9% by weight on the basis of the palmitic acid-stearic acid eutectic mixture distillable from said mixed fatty acids, adding a fatty acid material consisting predominantly of a fatty acid selected from the group consisting of palmitic and stearic acids to the deodorized mixture to produce a mixture having a ratio of stearic to palmitic acids in the range between a maximum of 75 parts stearic acid per 100 parts of palmitic stearic acid and a maximum of 58 parts of palmitic acid per 100 parts of palmitic-stearic acid in the fatty acid mixture, subjecting this adjusted fatty acid mixture to a substantially non-fractionating distillation under sub-atmospheric pressure, and at a temperature intermediate the boiling temperature of palmitic acid and the boiling temperature of stearic acid under the pressure conditions prevailing in the still, removing therefrom a distillate product having palmitic acid and stearic acid in proportions constituting a eutectic mixture and crystallizing a eutectic product identifiable as stearic acid of commerce.

6. In the production of stearic acid containing less than 9% of fatty acids having less than 16 carbon atoms from mixed fatty acids containing fatty acids having less than 16 carbon atoms, palmitic acid and stearic acid the steps comprising hydrogenating said fatty acid mixture to convert unsaturated materials therein to saturated compounds, adding to the hydrogenated mixture a fatty acid material consisting predominantly of a fatty acid material selected from the group consisting of palmitic acid and stearic acid to produce a mixture having a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the adjusted fatty acid mixture, and, irrespective of the order of the following steps, subjecting the adjusted fatty acid mixture to stripping distillation at reduced pressure to remove odor producing substances and fatty acids having less than 16 carbon atoms present in excess of 9% by weight on the basis of the palmitic acid-stearic acid eutectic mixture distillable from said mixed fatty acids, subjecting the deodorized fatty acid mixture to a substantially non-fractionating distillation under sub-atmospheric pressure, and at a temperature intermediate the boiling temperature of palmitic acid and the boiling temperature of stearic acid under the pressure conditions prevailing in the still, removing a distillate product having palmitic and stearic acid in proportions constituting a eutectic mixture and crystallizing from said distillate product a eutectic crystal product identifiable as stearic acid of commerce.

7. In the production of stearic acid containing less than 9% of fatty acids having less than 16 carbon atoms from mixed fatty acids containing fatty acids having less than 16 carbon atoms, palmitic acid and fatty acids having 18 carbon atoms, stearic acid and oleic acid, the steps comprising adding to the mixture a fatty acid material consisting predominantly of a fatty acid selected from the group consisting of palmitic, stearic and oleic acid in quantity to adjust the proportions of palmitic acid to acids having 18 carbon atoms to a ratio in the range between a maximum of 75 parts of acids having 18 carbon atoms per 100 parts of palmitic acids having 18 carbon atoms and a maximum of 58 parts by weight of palmitic acid per 100 parts of palmitic acids having 18 carbon atoms in the mixture, hydrogenating said adjusted fatty acid mixture to convert unsaturated materials therein to saturated compounds, subjecting the hydrogenated mixture of fatty acid to distillation at reduced pressure to remove odor producing substances and fatty acids having less than 16 carbon atoms present in excess of 9% by weight on the basis of the palmitic acid-stearic acid eutectic mixture distillable from said mixed fatty acids, subjecting the deodorized fatty acid mixture to a substantially non-fractionating distillation under sub-atmospheric pressure, and at a temperature intermediate the boiling temperature of palmitic acid and the boiling temperature of stearic acid under the pressure conditions prevailing in the still, removing a distillate product having palmitic acid and stearic acid in proportions constituting a eutectic mixture and crystallizing from said distillate product a eutectic crystal product identifiable as stearic acid of commerce.

8. In the production of eutectic stearic acid of commerce, from mixed fatty acids containing fatty acids having less than 16 carbon atoms, palmitic acid and stearic acid in which the palmitic and stearic acids are not present in proportions processable by normal procedures to stearic acid of commerce, the steps comprising hydrogenating said fatty acid mixture to convert unsaturated materials therein to saturated compounds, subjecting the hydrogenated mixture of fatty acids to stripping distillation at reduced pressure to remove odor-producing substances and to lower the content of fatty acids having less than 16 carbon atoms to below about 5% to produce a feed for distillation of substantially saturated fatty acid compounds having a ratio of stearic to palmitic acids in the range between a maximum of 75 parts of stearic acid per 100 parts of palmitic-stearic acid and a maximum of 58 parts of palmitic acid per 100 parts of palmitic-stearic acid in the adjusted fatty acid mixture, subjecting this adjusted fatty acid mixture to a substantially non-fractionating distillation under sub-atmospheric pressure, and at a temperature intermediate the boiling temperature of palmitic acid and the boiling temperature of stearic acid under the pressure conditions prevailing in the still, and removing therefrom a distillate product having palmitic acid and stearic acid in proportions crystallizing as a eutectic product identifiable as stearic acid of commerce.

9. In the production of eutectic stearic acid containing less than 9% of fatty acids having less than 16 carbon atoms from mixed fatty acids containing palmitic acid and stearic acid in which the palmitic and stearic acids are not present in proportions processable by normal procedures to stearic acid of commerce the steps comprising hydrogenating said fatty acid mixture to convert unsaturated materials therein to saturated compounds, subjecting the hydrogenated mixture of fatty acids to stripping distillation at reduced pressure to remove odor-producing substances and fatty acids having less than 16 carbon atoms present in excess of 9% by weight on the basis of the palmitic acid-stearic acid eutectic mixture distillable from said mixed fatty acids to produce a feed for distillation of substantially saturated fatty acid compounds having a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the fatty acid mixture, subjecting this fatty acid mixture to a substantially non-fractionating distillation under a sub-atmospheric pressure of less than about 50 mm. of mercury absolute and at a temperature intermediate the boiling temperature of palmitic acid and the boiling temperature of stearic acid under the pressure conditions prevailing in the still, and removing therefrom a distillate product having palmitic acid and stearic acid in proportions crystallizing as a eutectic product identifiable as stearic acid of commerce.

10. In the production of eutectic stearic acid containing less than 9% of fatty acids having less than 16 carbon atoms from mixed fatty acids containing unsaturated atoms from mixed fatty acids containing unsaturated fatty acids, palmitic acid and stearic acid in which the palmitic and stearic acids are not present in proportions processable by normal procedures to stearic acid of commerce the steps comprising removing at least a portion of the unsaturated fatty acids from said mixture of fatty acids, subjecting the remainder of the fatty acids to hydrogenation to convert unsaturated materials therein to saturated compounds, subjecting the hydrogenated mixture of fatty acids to stripping distillation at reduced pressure to remove odor-producing substances and fatty acids having less than 16 carbon atoms present in excess of 9% by weight on the basis of the palmitic acid-stearic acid eutectic mixture distillable from said mixed fatty acids to produce a feed for distillation of saturated fatty acid compounds having a ratio of stearic to palmitic acids in the range between a maximum of 75 parts of stearic acid per 100 parts of palmitic-stearic acid and a maximum of 58 parts of palmitic acid per 100 parts of palmitic-stearic acid in the fatty acid mixture, subjecting this fatty acid mixture to a substantially non-fractionating distillation under sub-atmospheric pressure less than about 50 mm. of mercury absolute and at a temperature intermediate the boiling temperature of palmitic acid and the boiling temperature of stearic acid under the pressure conditions prevailing in the still, and removing a distillate product having palmitic acid and stearic acid in proportions crystallizing as a eutectic product identifiable as stearic acid of commerce.

11. In the production of eutectic stearic acid of commerce from mixed fatty acids containing fatty acids having less than 16 carbon atoms, palmitic acid and stearic acid in which the palmitic and stearic acids are not present in proportions processable by normal procedures to stearic acid of commerce, said mixed fatty acids having an iodine number less than 12, the steps comprising steam stripping and deodorizing said fatty acids at reduced pressure to remove odor producing substances and to leave a residue containing less than 5% of fatty acids having less than 16 carbon atoms and having a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the fatty acid mixture, subjecting the stripped fatty acid mixture to a substantially non-fractionating distillation under sub-atmospheric pressure and at a temperature intermediate the boiling temperature of palmitic acid and the boiling temperature of stearic acid under the pressure conditions prevailing in the still, removing a distillate product having palmitic acid and stearic acid at proportions constituting a eutectic mixture and crystallizing a eutectic product identifiable as stearic acid of commerce.

12. In the production of eutectic stearic acid of commerce from mixed fatty acids containing fatty acids having less than 16 carbon atoms, palmitic acid and stearic acid, said mixed fatty acids having an iodine number of not more than 12, the steps comprising steam stripping said fatty acids at reduced pressure to remove odor producing substances and to leave a residue containing less than 3% of fatty acids having less than 16 carbon atoms and having a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the fatty acid mixture, subjecting the stripped fatty acid mixture to a substantially non-fractionating distillation under sub-atmospheric pressure and at a temperature intermediate the boiling temperature of palmitic acid and the boiling temperature of stearic acid under the pressure conditions prevailing in the still, removing a distillate product having palmitic acid and stearic acid at proportions constituting a eutectic mixture and crystallizing from said distillate product a eutectic crystal product identifiable as stearic acid of commerce.

13. In the production of eutectic stearic acid of commerce from tallow fatty acids containing palmitic acid and stearic acid and containing in excess of 40% of unsaturated fatty acids, the steps comprising cold pressing the mixed fatty acids for removal of a portion of the unsaturated fatty acids in which the palmitic and stearic acids are not present in proportions processable by normal procedures to stearic acid of commerce, hydrogenating the remaining fatty acids to an iodine number less than about 6, steam stripping the hydrogenated fatty acids to remove odor producing substances and fatty acids having less than 16 carbon atoms thereby reducing the content of the fatty acids of less than 16 carbon atoms to below 3%, subjecting the remaining fatty acids having a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the fatty acid mixture, to substantially non-fractionating distillation under sub-atmospheric pressure, and at a temperature intermediate the boiling temperature of palmitic acid and the boiling temperature of stearic acid under the pressure conditions prevailing in the still, removing therefrom a distillate product containing palmitic acid and stearic acid in approximately eutectic proportions having an iodine number not exceeding 4 and crystallizing the eutectic product identifiable as stearic acid of commerce.

14. In the production of eutectic stearic acid from tallow fatty acids containing palmitic acid and stearic acid and containing in excess of 40% unsaturated fatty acids, the steps comprising cold pressing the mixed fatty acids for removal of a portion of the unsaturated fatty acids, hydrogenating the remaining fatty acids to an iodine number no greated than 1, steam stripping the hydrogenated fatty acids to remove odor producing substances and fatty acids having less than 16 carbon atoms thereby reducing the content of the fatty acids of less than 16 carbon atoms to below 3%, subjecting the remaining fatty acid having a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the stripped fatty acid mixture, to substantially non-fractionating distillation under sub-atmospheric pressure and at a temperature intermediate the boiling temperature of palmitic acid and the boiling temperature of stearic acid under the pressure conditions prevailing in the still, removing therefrom a distillate product containing palmitic and stearic acids in eutectic proportions having an iodine number not exceeding 11 and crystallizing the eutectic product identifiable as stearic acid of commerce.

15. In the production of eutectic stearic acid from tallow fatty acids containing palmitic acid and stearic acid and containing in excess of 40% unsaturated fatty acids, the steps comprising cold pressing the mixed fatty acids for removal of a portion of the unsaturated fatty acids, hydrogenating the residual fatty acid mixture to an iodine number no greater than 1, subjecting the hydrogenated fatty acid mixture having a ratio of stearic acid to palmitic acid in the range between a maximum of 75 parts of stearic acid per 100 parts of palmitic-stearic acid and a maximum of 58 parts of palmitic acid per 100 parts of palmitic-stearic acid in the hydrogenated fatty acid mixture, to substantially non-fractionating distillation under sub-atmospheric pressure and at a temperature intermediate the boiling temperature of palmitic acid and the boiling temperature of stearic acid under the pressure conditions prevailing in the still, removing therefrom a vapor distillate, effecting a partial condensation of the vapor distillate at a temperature between about 163° C. and about 170° C., condensing the remainder of the vapor distillate at a temperature of about 90° C. and crystallizing from the condensate obtained at temperatures between about 163° C. and about 170° C. a eutectic product identifiable as stearic acid of commerce.

16. In the production of eutectic stearic acid of commerce containing less than 9% of fatty acids having less than 16 carbon atoms from mixed fatty acids containing fatty acids having less than 16 carbon atoms, palmitic acid and stearic acid which mixed fatty acids do not crystallize in eutectic form, said mixture of fatty acids having an iodine number less than 12 and a ratio of stearic acid to palmitic acid in the range between a maximum of 75 parts of stearic acid per 100 parts of palmitic-stearic acid and a minimum of about 51 parts of stearic acid per 100 parts of palmitic-stearic acid in the fatty acid mixture, the steps comprising irrespective of order, distilling said fatty acid mixture under sub-atmospheric pressure and at temperatures intermediate the boiling temperature of palmitic acid and the boiling temperature of stearic acid under the pressure conditions prevailing in the still, and fractionating out odor producing substances and fatty acids having less than 16 carbon atoms present in excess of 9% by weight on the basis of palmitic acid-stearic acid eutectic mixture distillable from said mixed fatty acids and crystallizing a eutectic product identifiable as stearic acid of commerce from the distillate product.

17. In the production of eutectic stearic acid containing less than 9% of fatty acids having less than 16 carbon atoms from mixed fatty acids containing fatty acids having less than 16 carbon atoms, palmitic acid and stearic acid which mixed fatty acids do not crystallize in eutectic form, the steps comprising hydrogenating said fatty acid mixture to convert unsaturated materials therein to saturated compounds, subjecting the hydrogenated mixtures of fatty acids to stripping distillation at reduced pressure to remove odor producing substances and fatty acids having less than 16 carbon atoms present in excess of 9% by weight on the basis of the palmitic acid-stearic acid eutectic mixture distillable from said mixed fatty acids, adding a fatty acid material consisting predominantly of a fatty acid selected from the group consisting of palmitic and stearic acids to the deodorized mixture to produce a mixture having a ratio of stearic to palmitic acids in the range between a maximum of 75 parts stearic acid per 100 parts of palmitic-stearic acid and a minimum of about 51 parts stearic acid per 100 parts of palmitic-stearic acid in the fatty acid mixture, subjecting this adjusted fatty acid mixture to a substantially non-fractionating distillation under sub-atmospheric pressure, and at a temperature intermediate the boiling temperature of palmitic acid and the boiling temperature of stearic acid under the pressure conditions prevailing in the still, removing therefrom a distillate product having palmitic acid and stearic acid in proportions constituting a eutectic mixture and crystallizing a eutectic product identifiable as stearic acid of commerce.

18. In the production of stearic acid containing less than 9% of fatty acids having less than 16 carbon atoms from mixed fatty acids containing fatty acids having less than 16 carbon atoms, palmitic acid and stearic acid which mixed fatty acids do not crystallize in eutetic form, the steps comprising hydrogenating said fatty acid mixture to convert unsaturated materials therein to saturated compounds, adding to the hydrogenated mixture a fatty acid material consisting predominantly of a fatty acid material selected from the group consisting of palmitic acid and stearic acid to produce a mixture having a ratio of stearic acid to palmitic acid in the range between a maximum of 75 parts of stearic acid per 100 parts of palmitic-stearic acid and a minimum of about 51 parts stearic acid per 100 parts of palmitic-stearic acid in the adjusted fatty acid mixture, and, irrespective of the order of the following steps, subjecting the adjusted fatty acid mixture to stripping distillation at reduced pressure to remove odor producing substances and fatty acids having less than 16 carbon atoms present in excess of 9% by weight on the basis of the palmitic acid-stearic acid eutectic mixture distillable from said mixed fatty acids, subjecting the deodorized fatty acid mixture to a substantially non-fractionating distillation under sub-atmospheric pressure, and at a temperature intermediate the boiling temperature of palmitic acid and the boiling temperature of stearic acid under the pressure conditions prevailing in the still, removing a distillate product having palmitic and stearic acid in proportions constituting a eutectic mixture and crystallizing from said distillate product a eutectic crystal product identifiable as stearic acid of commerce.

References Cited in the file of this patent

UNITED STATES PATENTS

| | | |
|---|---|---|
| 1,826,224 | Schultze | Oct. 6, 1931 |
| 2,293,676 | Myers et al. | Aug. 18, 1942 |
| 2,413,009 | Taussky | Dec. 24, 1946 |
| 2,505,012 | Spannuth | Apr. 28, 1950 |
| 2,575,526 | Myers | Nov. 20, 1951 |
| 2,804,427 | Suriano | Aug. 27, 1957 |

OTHER REFERENCES

Markley: Fatty Acids, Interscience Publishers, Inc., New York, 1947, pp. 582–595 (page 583 only is relied on).

Chemistry and Engineering News, vol. 27, page 3592, 1949.

UNITED STATES PATENT OFFICE
CERTIFICATE OF CORRECTION

Patent No. 2,985,674                            May 23, 1961

Thomas H. McGuine et al.

It is hereby certified that error appears in the above numbered patent requiring correction and that the said Letters Patent should read as corrected below.

Column 6, line 65, for "It" read -- If --; column 8, line 73, for "palmitic stearic acid" read -- palmitic-stearic acid --; column 10, line 27, after "containing" insert -- fatty acids having less than 16 carbon atoms, --.

Signed and sealed this 3rd day of October 1961.

(SEAL)
Attest:

ERNEST W. SWIDER
Attesting Officer

DAVID L. LADD
Commissioner of Patents